United States Patent [19]

Okuno et al.

[11] Patent Number: 4,562,237
[45] Date of Patent: Dec. 31, 1985

[54] ONE COMPONENT ROOM TEMPERATURE CURABLE SEALANT COMPOSITION

[75] Inventors: Eiichi Okuno, Nogimachi; Naomi Okamura, Sohwanmachi; Takashi Saitoh, Tokyo, all of Japan

[73] Assignee: Cemedine Co., Ltd., Tokyo, Japan

[21] Appl. No.: 515,548

[22] Filed: Jul. 20, 1983

[30] Foreign Application Priority Data

Aug. 2, 1982 [JP] Japan .................. 57-133796

[51] Int. Cl.$^4$ .................. C08G 77/18
[52] U.S. Cl. .................. 528/17; 525/403; 525/404; 525/408; 525/409; 525/454; 524/775; 775/788; 528/18; 528/21; 528/30; 528/32; 528/34
[58] Field of Search .................. 528/32, 34, 30, 17, 528/18, 21; 525/403, 404, 408, 409

[56] References Cited

U.S. PATENT DOCUMENTS

| | | | |
|---|---|---|---|
| 4,220,748 | 9/1980 | Hashimoto et al. | 528/32 |
| 4,311,737 | 1/1982 | Ishizaka et al. | 528/34 |

FOREIGN PATENT DOCUMENTS

| | | | |
|---|---|---|---|
| 739101 | 3/1970 | Belgium | 528/34 |
| 2551275 | 5/1976 | Fed. Rep. of Germany | 528/34 |

Primary Examiner—Wilbert J. Briggs, Sr.
Attorney, Agent, or Firm—Oblon, Fisher, Spivak, McClelland & Maier

[57] ABSTRACT

A one component room temperature curable sealant composition comprising:
(A) a polyether polymer having at its terminal a hydrolyzable silicone functional group represented by the general formula:

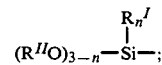

(B) a partial addition condensation product of:
(a) an aminoalkylalkoxysilane represented by the general formula:

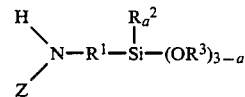

with
(b) an epoxy compound containing at least one epoxy group in its molecule and having a molecular weight of from 100 to 1000 and an epoxy equivalent of from 100 to 500,
(c) a compound represented by the general formula:

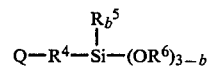

(d) an alkoxy silane represented by the general formula:

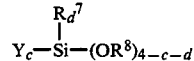

(e) an organic titanic acid ester; and
(C) a condensation catalyst of a silanol compound.

9 Claims, No Drawings

ONE COMPONENT ROOM TEMPERATURE CURABLE SEALANT COMPOSITION

BACKGROUND OF THE INVENTION

1. Field of the Invention

The present invention relates to a one component room temperature curable sealant composition. Particularly, it relates to a one component room temperature curable sealant composition which is useful as a sealing material, an adhesive or an injection molding material and which exhibits good adhesion to various substrates including metal, glass and coated steel sheets and plastics such as a vinyl chloride resin, an acrylic resin or a styrol resin, without requiring a primer coating. More particularly, the composition of the present invention is widely useful as a sealant for various applications, for instance, for sealing the joint of interior or exterior building structures, repairing cracks in mortar or concrete structures, fixing the windshields of automobiles, sealing seams of joined steel sheets, etc., and it can advantageously be applied directly to substrate surfaces such as metal, glass, melamine and acrylic resin surfaces without employing a primer.

2. Description of the Prior Art

As a one component room temperature curable sealant, a silicone or polyurethane sealant is well known. The silicone sealant has advantages such that it has good weather resistance and heat resistance, and its curing speed is high and yet its storage stability is good. On the other hand, it has disadvantages such that a coating composition is hardly applied onto a cured silicone sealant, and it is likely to stain stone materials. Whereas the polyurethane sealant has advantages such that it is superior to the silicone sealant in the curing properties, and it has good comparability with a coating composition and its production costs are relatively low. On the other hand, the polyurethane sealant has drawbacks such that it is inferior in the weather resistance and heat resistance, and its storage stability tends to be poor when it is made to have a high curing speed.

Under the circumstances, an attention has been drawn to the a polyether polymer having hydrolyzable silicone functional groups, as a prospective material having advantages of both the silicone and polyurethane sealants and complementing the disadvantages thereof.

Heretofore, with respect to a one component room temperature curable composition for a sealing material, a coating material, an adhesive and an injection molding material, there has been proposed a composition comprising (A) an addition product of a polyether urethane prepolymer having terminal isocyanate groups and γ-amino-propyltrimethoxysilane and (B) a small amount of N-β(aminoethyl)-γ-amino propyltrimethoxysilane (Japanese Examined Patent Publication No. 5061/1978) as the material containing as the basic component a polyether polymer having a hydrolyzable silicone functional group as its terminal group.

Further, there has been proposed a composition containing as the main component an oxypropylene polymer having a terminal silylether group represented by the formula:

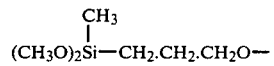

(Japanese Unexamined Patent Publications No. 156599/1975 and No. 73998/1977).

However, these compositions had a disadvantage such that they are hardly bonded to the above-mentioned substrates without a primer coating.

As additives to improve the adhesion of the polyether polymer having at its terminal a hydrolyzable silicone functional group, there have been known a phenol resin, an epoxy resin (Japanese Unexamined Patent Publications No. 73729/1977 and No. 156599/1975), a polyisocyanate compound having an active isocyanate group (Japanese Unexamined Patent Publication No. 73729/1980) and a triazine ring compound (Japanese Unexamined Patent Publication No. 34154/1982). However, these additives do not necessarily provide adequate effectiveness and have drawbacks such that they are inferior in the water-resistant bonding and durability, whereby there have been problems such that stabilized bond strength is hardly obtainable due to restrictions with respect to the curing catalyst or the mixing conditions, and that no adequate storage stability is obtainable as a one component sealant.

Further, when N-β(aminoethyl)-γ-aminopropyl-trimethoxysilane is added to the above polymer as proposed in Japanese Examined Patent Publication No. 5061/1978, the adhesion to glass or aluminum can be improved, but the water resistance tends to be poor, whereby no stabilized bond strength will be obtained.

SUMMARY OF THE INVENTION

The present inventors have conducted extensive researches to overcome the above-mentioned drawbacks of the conventional sealants and to provide a one component room temperature curable sealant composition which can be applied to various substrates without requiring a primer and which, at the same time, has good water-resistant bond strength, durability and storage stability. As a result, the present invention has been accomplished.

Namely, the present invention provides a one component room temperature curable sealant composition comprising the following components (A), (B) and (C):

(A) a polyether polymer having at its terminal a hydrolyzable silicone functional group represented by the general formula:

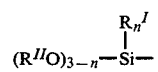

where $R^I$ is a monovalent hydrocarbon group having from 1 to 12 carbon atoms, $R^{II}$ is a monovalent hydrocarbon group having from 1 to 6 carbon atoms, and n is an integer of 0 to 2;

(B) a partial addition condensation product of:
(a) an aminoalkylalkoxysilane represented by the general formula:

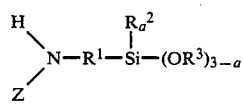

where $R^1$ is a divalent hydrocarbon group having from 1 to 4 carbon atoms, each of $R^2$ and $R^3$ is a monovalent hydrocarbon group having from 1 to 4 carbon atoms, Z is a hydrogen atom or an aminoalkyl group, and a is an integer of 0 or 1, with (b) an epoxy compound containing at least one epoxy group in its molecule and having a molecular weight of from 100 to 1000 and an epoxy equivalent of from 100 to 500, (c) a compound represented by the general formula:

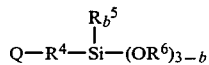

where $R^4$ is a divalent hydrocarbon group having from 1 to 4 carbon atoms, each of $R^5$ and $R^6$ is a monovalent hydrocarbon group having from 1 to 4 carbon atoms, Q is a glycidoxy group, an epoxycyclohexyl group or a methacryloxy group, and b is an integer of 0 or 1, (d) an alkoxy silane represented by the general formula:

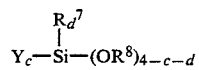

where each of $R^7$ and $R^8$ is a monovalent hydrocarbon group having from 1 to 4 carbon atoms, Y is a monovalent hydrocarbon group containing a functional group other than an amino group, an epoxy group and a methacryloxy group, and each of c and d is an integer of 0 to 2, provided that the sum of c and d is from 0 to 2, and/or (e) an organic titanic acid ester; and (C) a condensation catalyst or a silanol compound.

DETAILED DESCRIPTION OF THE PREFERRED EMBODIMENTS

In the present invention, the polyether polymer (A) having at its terminal a hydrolyzable silicone functional group represented by the general formula:

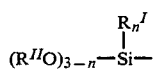

where $R^I$ is a monovalent hydrocarbon group having from 1 to 12 carbon atoms, $R^{II}$ is a monovalent hydrocarbon group having from 1 to 6 carbon atoms and n is an integer of 0 to 2, is preferably a polyether polymer wherein the principal chain essentially comprises repeating units represented by the formula —R—O— where R is a divalent alkylene group having from 2 to 4 carbon atoms, and at least one of the terminal groups is the hydrolyzable fuctional group represented by the above-mentioned general formula.

As the polyether polymer (A) to be used in the present invention, there may be mentioned, for instance, a reaction product of a polyether urethane prepolymer having a terminal isocyanate group and γ-aminopropyltrimethoxysilane, γ-aminopropyltriethoxysilane or γ-mercaptopropyltrimethoxysilane (Japanese Examined Patent Publication No. 30711/1971), or an oxypropylene polymer having a terminal silyether group represented by the formula:

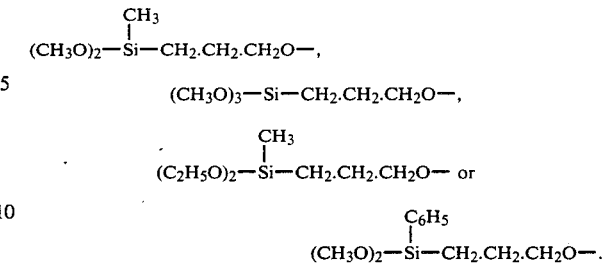

The aminoalkylalkoxysilane (a) in the present invention is a compound represented by the general formula:

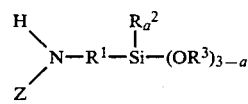

where $R^1$ is a divalent hydrocarbon group having from 1 to 4 carton atoms, each of $R^2$ and $R^3$ is a monovalent hydrocarbon group having from 1 to 4 carbon atoms, Z is a hydrogen atom or an aminoalkyl group, and a is an integer of 0 or 1, as mentioned above. As its specific examples, there may be mentioned aminomethyltriethoxysilane, N-β (aminoethyl) aminomethyltrimethoxysilane, aminomethyldiethoxysilane, N-β(aminoethyl) methyltributoxysilane, γ-aminopropyltrimethoxysilane, γ-aminopropyltriethoxysilane, γ-aminopropylmethyldiethoxysilane, γ-aminoisobutyltrimethoxysilane, N-β(aminoethyl)) γ-aminopropyltrimethoxysilane, N-β(aminoethyl) γ-aminopropylmethyldimethoxysilane, and (}N-β(aminoethyl){ N-β(aminoethyl) γ-aminopropyltrimethoxysilane.

The epoxy compound (b) in the present invention is a compound containing at least one epoxy group in its molecule and having a molecular weight of from 100 to 1000 and an epoxy equivalent of from 100 to 500. Various compounds may be mentioned as such a compound. Particularly preferred are bisphenol A type epoxy compounds.

The above-mentioned aminoalkylalkoxysilane (a) and the epoxy compound (b) provide, by the reaction of the amino groups with the epoxy groups, adhesiveness superior in the water resistance and durability. The amount of the epoxy compound is usually from 0.03 to 2.6 equivalent, preferably from 0.3 to 1.0 equivalent, relative to the aminoalkylalkoxysilane. If the amount of the epoxy compound is less than the above range, the water resistance tends to be poor. On the other hand, if the amount is greater than the above range, the storage stability tends to be inferior.

As mentioned above, the compound (c) in the present invention is a compound represented by the general formula:

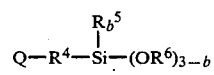

where $R^4$ is a divalent hydrocarbon group having from 1 to 4 carbon atoms, each of $R^5$ and $R^6$ is a monovalent hydrocarbon group having from 1 to 4 carbon atoms, Q is a glycidoxy group, an epoxycyclohexyl group or a methacryloxy group, and b is an integer of 0 or 1. As its specific examples, there may be mentioned γ-glycidoxypropyltrimethoxysilane, γ-glycidoxypropylmethyldiethoxysilane, 3,4-epoxycyclohexylethyltrimethoxysilane, γ-methacryloxypropyltrimethoxysilane and γ-methacryloxypropylmethyldimethoxysilane.

The above-mentioned aminoalkylalkoxysilane (a) and the compound (c) provide superior adhesive bonding by the addition reaction of the amino groups of the aminoalkylalkoxysilane (a) with the epoxy groups or/and the methacryl groups of the compound (c). The compound (c) is usually reacted in an amount of from 0.03 to 2.6 equivalent, preferably from 0.3 to 1.0 equivalent, relative to the aminoalkylalkoxysilane. If the proportion of the compound (c) is less than the above range, the water-resistant bonding tends to be poor. On the other hand, if the proportion is greater than the above range, the bonding at a normal temperature will be inferior.

As mentioned above, the alkoxysilane (d) in the present invention is a compound represented by the general formula:

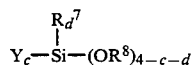

$$Y_c-\underset{\underset{|}{R_d^7}}{Si}-(OR^8)_{4-c-d}$$

where each of $R^7$ and $R^8$ is a monovalent hydrocarbon group having from 1 to 4 carbon atoms, Y is a monovalent hydrocarbon group containing a functional group other than an amino group, and epoxy group and a methacryloxy group, each of c and d is an integer of 0 to 2, provided the sum of c and d is from 0 to 2. As its specific examples, there may be mentioned so-called silane coupling agents such as vinyl trimethoxysilane, vinyl triethoxysilane, γ-mercaptopropyltrimethoxysilane, γ-chloropropyltrimethoxysilane or vinyl tris (β-methoxyethoxy) silane; alkoxysilanes such as dimethyldimethoxysilane, methyltrimethoxysilane, tetramethoxysilane, dimethyldimethoxysilane, methyltriethoxysilane, tetraethoxysilane, diphenyldimethoxysilane or phenyltrimethoxysilane.

The aminoalkylalkoxysilane (a) and the alkoxysilane (d) provide highly water-resistant bonding by the condensation reaction of the amino groups of the aminoalkylalkoxysilane (a) with the alkoxy groups of the alkoxysilane (d). The alkoxysilane (d) is reacted usually in an amount of from 0.03 to 2.6 mols, preferably from 0.3 to 1.0 mol, relative to the aminoalkoxysilane. If the amount of the alkoxysilane is less or more than the above range, stabilized bonding will not be obtained. In this case, it is preferred that water is added in an amount of from 0.05 to 1.5 mols per mol of the alkoxysilane (d) to be reacted with the aminoalkoxysilane (a), for hydrolysis. If the amount of the water is less than this range, it tends to be difficult to obtain stabilized bonding. On the other hand, if the amount of the water is greater than this range, the storage stability will be impaired.

The organic titanic acid ester (e) in the present invention serves to substantially improve the bonding when used in combination with the aminoalkoxysilane (a). As specific examples of the organic titanic acid ester, there may be mentioned tetraisopropyl titanate, tetra-n-butyl titanate, butyl titanate dimer and tetra (2-ethylhexyl) titanate. The organic titanic acid ester (e) is added in an amount of from 0.1 to 1.2 mols, preferably from 0.3 to 1.0 mol, relative to the aminoalkylalkoxysilane (a). Stabilized bonding will be hardly obtainable if the amount of the organic titanic acid ester is less or more than the above mentioned range.

The epoxy compound (b), the compound (c), the alkoxysilane (d) and the organic titanic acid ester (e) to be reacted with the aminoalkylalkoxysilane (a) in the present invention, may respectively be a single kind or a combination of different kind.

The amount of the partial addition condensation product obtained by the reaction of these materials, is preferably within a range of from 0.5 to 10 parts by weight relative to 100 parts by weight of the polyether polymer (A) having a hydrolyzable silicone functional terminal group. If the amount is less than 0.5 part by weight, no adequate effectiveness of the addition is obtainable. On the other hand, if the amount exceeds 10 parts by weight, the curing properties of the sealant composition tend to be impaired and the cost will be increased.

As the condensation catalyst (C) of a silanol compound in the present invention, there may effectively be used conventional silanol condensation catalysts, for instance, metal salt of carboxylic acid such as an organic silicone titanate, stannous octoate butyl tin diacetate or dibutyl tin dilaurate, or amine salts such as dibutylamine-2-ethylhexoate.

The amount of the condensation catalyst (C) is usually from 0.05 to 5 parts by weight per 100 parts by weight of the polyether polymer (A).

Further, an oxide of a metal belonging to Group II of Periodic Table such as zinc oxide, calcium oxide or magnesium oxide and/or an organic primary amine such as xylylenediamine, hexamethylenediamine or octylamine may be incorporated to the sealant composition of the present invention, as a co-catalyst to adjust the curing speed, as the case requires.

Furthermore, a filler, a plasticizer, a pigment, an aging-preventive agent, a ultra violet ray absorbing agent or a viscosity controlling agent may also be added to the composition of the present invention depending upon the particular purpose of the composition.

As the filler, there may be mentioned a reinforcing filler such as fumed silica, precipitated silica, silicic anhydride, silicic acid hydrate or carbon black; a filler such as calcium carbonate, magnesium carbonate, diatomaceous earth, sintered clay, clay, talc, titanium oxide, bentonite, organic bentonite, ferric oxide or silas balloon; and a fibrous filler such as asbestos, glass fibers, or glass filaments.

As the plasticizer, there may be used commonly employed plasticizers, for instance, phthalic acid esters such as dioctylphthalate, dibutylphthalate or butyl benzyl phthalate; aliphatic dibasic acid esters such as dioctyl adipate, isodecyl succinate or dibutyl sebacate: glycol esters such as eithyleneglycol dibenzoate or pentaerythritol ester; aliphatic esters such as butyl oleate or methyl acetylricinolate; phosphoric acid esters such as tricresyl phosphate or trioctyl phosphate; and chlorinated paraffins. Further, a liquid resin having a molecular weight of from 100 to 10,000 may be used as the plasticizer. As such a liquid resin, there may be mentioned a xylene resin, polybutadiene, polyoxypropylene glycol, polyoxypropylenetriol, a polyester resin, an acryl oligomer, NBR, SBR or polysulfide rubber.

Now, the present invention will be described in further detail with reference to Examples and Comparative Examples. In these Examples, "part" means "part by weight".

EXAMPLE 1

Preparation of a partial addition condensation product ($b^1$)

To 44 g of γ-aminopropyltriethoxysilane, 33.4 g of Epicoat 828 (Tradename, manufactured by Yuka Shell K.K.) was added, and the mixture was stirred at 50° C. for 4 hours, whereby a partial addition condensation product ($b^1$) was obtained.

Preparation of a partial addition condensation product ($b^2$)

44 g of γ-aminopropyltriethoxysilane, 39.5 g of phenyltrimethoxysilane and 38.4 g of Epicoat 828 were mixed and stirred to react them at 50° C. for 20 hours, whereby a partial addition condensation product ($b^2$) was obtained.

Preparation of a sealant composition

To 100 parts of poly(methyl dimethoxysilylethylether) (MSP-20A, Tradename, manufactured by Kanegafuchi Chemical Ind. Co., Ltd.) as the polyether polymer (A), 20 parts of a plasticizer DOP, 30 parts of thermal carbon, 50 parts of calcium carbonate, 2 parts of magnesium oxide and 2 parts of an anti-oxidant agent were added, and the mixture was stirred at room temperature until it became pastelike. Then, the mixture was thoroughly kneaded by three rolls to obtain a uniform paste. To this paste, 50 parts of toluene was added, and the mixture was stirred at room temperature and then heated to azeotropically remove the water from the material. Further, toluene was recovered under reduced pressure, and then the material was cooled to room temperature.

Then, the above-mentioned operation was repeated to obtain two compositions having the same formulation. To the respective compositions, 1 part of the above-mentioned condensation product ($b^1$) or ($b^2$) as the partial addition condensation product (B) and 1 part of dibutyl tin acetate as the condensation catalyst (C) were added, and the mixtures were stirred for 30 minutes in a nitrogen stream, whereby 2 sealant compositions were obtained. These sealant compositions were put in sealed containers, respectively, and stored.

Adhesion and peeling test

The compositions of the present invention prepared in the above-mentioned manner were respectively coated on an aluminum plate, a glass plate, a melamine-coated steel plate and a hard polyvinyl chloride resin sheet in a bead pattern having a thickness of 5 mm, a width of 10 mm and a length of 100 mm to obtain test pieces. These test pieces were cured at 20° C. under a relative humidity of 65% for 7 days at room temperature.

Then, these test pieces were subjected to a peeling test at an angle of 180° with fingers. In this peeling test, cut lines reaching the substrate surface were made by a razor blade on the coated sealant layer with a distance of every 10 mm, and the strip of the coated sealant layer was peeled for 10 mm.

Separately, a similar peeling test (water-resistant test) was conducted with respect to test pieces after immersing them in water. Namely, test pieces were prepared in the same manner as above, and cured at 20° under relative humidity of 65% for 7 days, and then the test pieces were immersed in warm water of 40° C. for 7 days. Then, the test pieces were subjected to the peeling test in the same manner as above. In this case, the peeling test was conducted immediately after the test pieces were taken out from the warm water (i.e. while they are still wet).

The results of the above test are shown in Table 1.

COMPARATIVE EXAMPLES 1 and 2

Sealant compositions were prepared in the same manner as in Example 1 except that instead of the condensation product ($b^1$) or ($b^2$), γ-aminopropyltriethoxysilane or Epikote 828 ® was incorporated. The adhesion and peeling tests were conducted in the same manner as in Example 1. The results are shown in Table 1.

Further, for the purpose of comparison, similar adhesion and peeling tests were conducted with respect to 2 kinds of commercially available silicone sealants and polyurethane sealants. The results are shown in Table 1.

TABLE 1

| Sealants | Condensation products | Ageing conditions | Substrates | | | |
|---|---|---|---|---|---|---|
| | | | Glass plate | Aluminum plate | Melamine plate | Hard polyvinyl-chloride sheet |
| Example 1 | | | | | | |
| No. 1 | Condensation product ($b^1$) | Initial | O | O | O | O |
| | | Water-resistance | O | O | O | O |
| No. 2 | Condensation product ($b^2$) | Initial | O | O | O | O |
| | | Water-resistance | O | O | O | O |
| Comparative Example 1 | γ-Aminopropyl-triethoxysilane | Initial | O | O | Δ | X |
| | | Water-resistance | X | X | X | X |
| Comparative Example 2 | Epikote 828 ® | Initial | X | X | X | X |
| | | Water-resistance | X | X | X | X |
| Commercial product (Silicone type A) | — | Initial | O | Δ | Δ | O |
| | | Water-resistance | O | X | X | X |
| Commerical product (Silicone type B) | — | Initial | O | O | O | Δ |
| | | Water-resistance | X | X | Δ | Δ |
| Commercial product (Polyurethane type C) | — | Initial | O | O | O | X |
| | | Water-resistance | O | X | O | X |
| Commercial | — | Initial | X | X | O | X |

TABLE 1-continued

| Sealants | Condensation products | Ageing conditions | Substrates | | | |
|---|---|---|---|---|---|---|
| | | | Glass plate | Aluminum plate | Melamine plate | Hard polyvinyl-chloride sheet |
| product (Polyurethane type D) | | Water-resistance | X | X | O | X |

Notes:
1. O: Cohesive fracture
Δ: Combination of cohesive fracture and interfacial fracture
X: Interfacial fracture
2. Commercial product (Silicone type A): Acetic acid type sealant
3. Commercial product (Silicone type B): Oxime type sealant
4. Commercial product (Polyurethane type C): Sealant composed mainly of TDI prepolymer
5. Commercial product (Polyurethane type D): Sealant composed mainly of MDI prepolymer

EXAMPLE 2

Preparation of a partial addition condensation product ($b^3$) to ($b^{10}$)

As shown in Table 2, various partial addition condensation products were prepared by reacting various aminoalkylalkoxysilanes with various silane compounds under the temperature and reaction time conditions as shown in Table 2.

jected to the adhesion and peeling tests in the same manner as in Example 1. The results are shown in Table 3.

COMPARATIVE EXAMPLES 3 to 5

Sealant compositions were prepared in the same manner as in Example 1 except that instead of the condensation product ($b^1$) or ($b^2$) used in Example 1, N-β(aminoethyl)γ-aminopropyltrimethoxysilane, γ-glycidoxy-

TABLE 2

| Aminoalkylalkoxysilane (Amount) | Silane compounds (Amount) | Temperature (°C.) | Time (hr.) | Obtained partial addition condensation products |
|---|---|---|---|---|
| N—β(Aminoethyl)γ-aminopropyltrimethoxysilane (22.2 g) | γ-Glycidoxypropyl trimethoxysilane (23.6 g) | 80 | 3 | ($b^3$) |
| N—β(Aminoethyl)γ-aminopropyltrimethoxysilane (22.2 g) | γ-Glycidoxypropyl trimethoxysilane (47.2 g) | 80 | 2 | ($b^4$) |
| N—β(Aminoethyl)γ-aminopropyltrimethoxysilane (22.2 g) | γ-Glycidoxypropyl trimethoxysilane (11.8 g) | 80 | 2 | ($b^5$) |
| γ-Aminopropyltriethoxysilane (22.1 g) | γ-Glycidoxypropyl (11.8 g) | 100 | 3 | ($b^6$) |
| γ-Aminopropyltriethoxysilane (22.1 g) | γ-Methacryloxypropyl trimethoxysilane (12.4 g) | 120 | 5 | ($b^7$) |
| N—β(Aminoethyl)γ-aminopropyltrimethoxysilane (22.2 g) | γ-Methacryloxypropyl trimethoxysilane (12.4 g) | 120 | 5 | ($b^8$) |
| N—β(Aminoethyl)γ-aminopropyltrimethoxysilane (22.2 g) | γ-Methacryloxypropyl trimethoxysilane (24.8 g) | 120 | 5 | ($b^9$) |
| Propyldiethylene triamine trimethoxysilane (26.5 g) | γ-Methacryloxypropyl trimethoxysilane (24.8 g) | 120 | 5 | ($b^{10}$) |

Then, eight sealant compositions were prepared in the same manner as in Example 1 except that instead of the condensation product ($b^1$) or ($b^2$) used in Example 1, condensation products ($b^3$) to ($b^{10}$) of Table 2 were respectively used. The sealant compositions were subpropyltrimethoxysilane and γ-methacryloxypropyltrimethoxysilane were respectively used. The sealant compositions were subjected to the adhesion and peeling tests in the same manner as in Example 1. The results are shown in Table 3.

TABLE 3

| Sealants | Condensation products | Ageing conditions | Substrates | | | |
|---|---|---|---|---|---|---|
| | | | Glass plate | Aluminum plate | Melamine plate | Hard polyvinyl-chloride sheet |
| Example 2 | | | | | | |
| No. 1 | ($b^3$) | Initial | O | O | O | O |
| | | Water-resistance | O | O | O | O |
| No. 2 | ($b^4$) | Initial | O | O | O | O |
| | | Water-resistance | O | O | O | O |
| No. 3 | ($b^5$) | Initial | O | O | O | O |
| | | Water-resistance | Δ | O | O | O |
| No. 4 | ($b^6$) | Initial | O | O | O | O |
| | | Water-resistance | O | O | Δ | Δ |
| No. 5 | ($b^7$) | Initial | O | O | O | O |

TABLE 3-continued

| Sealants | Condensation products | Ageing conditions | Substrates | | | |
|---|---|---|---|---|---|---|
| | | | Glass plate | Aluminum plate | Melamine plate | Hard polyvinyl-chloride sheet |
| No. 6 | (b[8]) | Water-resistance | O | O | O | Δ |
| | | Initial | O | O | O | O |
| No. 7 | (b[9]) | Water-resistance | O | O | O | O |
| | | Initial | O | O | O | O |
| No. 8 | (b[10]) | Water-resistance | Δ | Δ | O | O |
| | | Initial | O | O | O | O |
| Comparative Example 3 | *1 | Initial | O | O | O | X |
| | | Water-resistance | X | X | X | X |
| Comparative Example 4 | *2 | Initial | X | X | X | X |
| | | Water-resistance | X | X | X | X |
| Comparative Example 5 | *3 | Initial | X | X | X | X |
| | | Water-resistance | X | X | X | X |

Notes:
1. O, Δ, and X: Same as in Table 1.
2. *1: N—β(Aminoethyl)γ-aminopropyltrimethoxysilane
*2: γ-Glycidoxypropyltrimethoxysilane
*3: γ-Methacryloxypropyltrimethoxysilane

EXAMPLE 3

Preparation of partial addition condensation products (b[11]) to (b[16])

As shown in Table 4, various partial addition condensation products were prepared by reacting an aminoalkylalkoxysilane with various alkoxysilane compounds in the presence of water at the temperature and for the reaction time as shown in Table 4.

TABLE 4

| Aminoalkylalkoxysilane (Amount g) | Alkoxysilane (Amount g) | Amount of water (g) | Temperature (°C.) | Time (hr.) | Obtained partial additional condensation products |
|---|---|---|---|---|---|
| N—β(Aminoethyl)γ-aminopropyltrimethoxysilane (22.2) | Phenyltrimethoxysilane (9.9) | 0.9 | 50 | 20 | (b[11]) |
| N—β(Aminoethyl)γ-aminopropyltrimethoxysilane (22.2) | Phenyltrimethoxysilane (9.9) | 0.45 | 50 | 20 | (b[12]) |
| N—β(Aminoethyl)γ-aminopropyltrimethoxysilane (22.2) | Vinyltrimethoxysilane (7.4) | 0.9 | 50 | 20 | (b[13]) |
| N—β(Aminoethyl)γ-aminopropyltrimethoxysilane (22.2) | Methyltrimethoxysilane (6.8) | 0.9 | 50 | 20 | (b[14]) |
| N—β(Aminoethyl)γ-aminopropyltrimethoxysilane (22.2) | γ-Chloropropylmethyldimethoxysilane (9.3) | 0.9 | 50 | 20 | (b[15]) |
| N—β(Aminoethyl)γ-aminopropyltrimethoxysilane (22.2) | γ-Mercaptopropyltrimethoxysilane (9.8) | 0.9 | 70 | 20 | (b[16]) |

Six sealant compositions were prepared in the same manner as in Example 1 except that instead of the condensation product (b[1]) or (b[2]) used in Example 1, condensation products (b[11]) to (b[16]) were respectively used. The sealant compositions were subjected to the adhesion and peeling tests as in Example 1. The results are shown in Table 5.

TABLE 5

| Sealants | Condensation products | Ageing conditions | Substrates | | | |
|---|---|---|---|---|---|---|
| | | | Glass plate | Aluminum plate | Melamine plate | Hard polyvinyl-chloride sheet |
| Example 3 | | | | | | |
| No. 1 | (b[11]) | Initial | O | O | O | O |
| | | Water-resistance | O | O | O | O |
| No. 2 | (b[12]) | Initial | O | O | O | O |
| | | Water-resistance | O | O | O | O |
| No. 3 | (b[13]) | Initial | O | O | O | O |
| | | Water-resistance | O | O | O | O |
| No. 4 | (b[14]) | Initial | O | O | O | O |
| | | Water-resistance | O | O | O | O |
| No. 5 | (b[15]) | Initial | O | O | O | O |
| | | Water-resistance | O | Δ | O | O |
| No. 6 | (b[16]) | Initial | O | O | O | O |
| | | Water-resistance | O | O | O | O |

Notes:
O and Δ have the same meanings as in Table 1.

EXAMPLE 4

Preparation of partial addition condensation products (b$^{17}$) and (b$^{18}$)

To 22.2 g of N-β(aminoethyl)γ-aminopropyltrimethoxysilane, 11.2 g of tetraisopropyltitanate was added, and the mixture was stirred at 50° C. for 20 hours, whereby a condensation product (b$^{17}$) was obtained.

On the other hand, to 22.2 g of N-β(aminoethyl)γ-aminopropyltrimethoxysilane, 14.2 g of tetraisopropyltitanate and 9.9 g of phenyltrimethoxysilane were added, and the mixture was stirred at 50° C. for 20 hours, whereby a condensation product (b$^{18}$) was obtained.

Two sealant compositions were prepared in the same manner as in Example 1 except that instead of the condensation product (b$^1$) or (b$^2$) used in Example 1, the condensation product (b$^{17}$) or (b$^{18}$) was used, respectively. The sealant compositions were subjected to the adhesion and peeling tests in the same manner as in Example 1. The results are shown in Table 6.

TABLE 6

| Sealants | Condensation products | Ageing conditions | Substrates | | | |
|---|---|---|---|---|---|---|
| | | | Glass plate | Aluminum plate | Melamine plate | Hard polyvinyl-chloride sheet |
| Example 4 | | | | | | |
| No. 1 | (b$^{17}$) | Initial | O | O | O | O |
| | | Water-resistance | O | O | O | O |
| No. 2 | (b$^{18}$) | Initial | O | O | O | O |
| | | Water-resistance | O | O | O | O |

Note:
O: Same as in Table 1

EXPERIMENT 1

Durability test

The representative sealant compositions prepared in Examples 1 to 4 were respectively coated on aluminum plate on a bead pattern having a thickness of 2 mm, a width of 10 mm and a length of 100 mm, and cured at 20° C. under a relative humidity of 65% for 7 days. Then, the applied sealant compositions were subjected to irradiation of ultra-violet rays for 500 hours by means of a Sun Shine Weather Meter, whereupon the change of surface condition was observed. The results thereby obtained are shown in Table 7.

Storage stability test

The representative sealant compositions prepared in Examples 1 to 4 and placed in sealed containers, were subjected to accelerated storage at 50° C. for 30 days. Then, they were brought to 20° C., and their viscosities were measured by a Brook Field Type Rotary Viscometer. The test results are shown in Table 7.

Further, for the purpose of the comparison, similar tests were conducted with respect to commercial product of silicone sealants and polyurethane sealants. The results thereby obtained are shown in Table 7.

TABLE 7

| Sealants | Durability Weather Meter 500 hrs. | Storage stability (Pois/20° C.) | |
|---|---|---|---|
| | | Initial | 50° C. × 30 days |
| Example 1 No. 2 | No change | 4,600 | 6,100 |
| Example 2 No. 2 | " | 4,800 | 6,000 |
| Example 2 No. 6 | " | 4,300 | 6,200 |
| Example 3 No. 2 | " | 4,900 | 5,500 |
| Example 3 No. 6 | " | 4,700 | 5,100 |
| Example 4 No. 2 | " | 4,700 | 6,500 |
| Commercial product (Silicone type A) | " | 5,100 | 5,400 |
| Commercial product (Silicone type B) | " | 5,500 | 6,300 |
| Commercial product (Polyurethane type C) | Numerous surface cracks | 5,700 | Considerable viscosity increase (measurement impossible) |
| Commercial product (Polyurethane type D) | Numerous surface cracks | 5,300 | Considerable viscosity increase (measurement impossible) |

Note:
The commercial products are the same as mentioned in the Notes of Table 1.

We claim:

1. A one component room temperature curable sealant composition comprising:

(A) a polyether polymer having at its terminal a hydrolyzable silicon functional group represented by the formula:

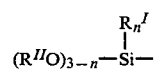

wherein R$^I$ is a monovalent hydrocarbon group having from 1 to 12 carbon atoms, R$^{II}$ is a monovalent hydrocarbon group having from 1 to 6 carbon atoms, and n is an integer of 0 to 2;

(B) a partial addition condensation product of:
(a) an aminoalkylalkoxysilane represented by the formula:

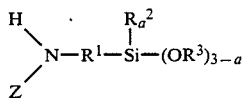

wherein $R^1$ is a divalent hydrocarbon group having from 1 to 4 carbon atoms, each of $R^2$ and $R^3$ is a monovalent hydrocarbon group having from 1 to 4 carbon atoms, Z is a hydrogen atom or an aminoalkyl group, and a is an integer of 0 or 1, with (b) an epoxy compound containing at least one epoxy group in its molecular structure and having a molecular weight of from 100 to 1,000 and an epoxy equivalent of from 100 to 500, wherein 0.3–1.0 equivalents of epoxy are used per equivalent of aminoalkylalkoxysilane, (c) a compound selected from the group consisting of γ-glycidoxypropyltrimethoxysilane, γ-glycidoxypropylmethyldiethoxysilane, 3,4-epoxycyclohexylethyltrimethoxysilane, γ-methacryloxypropyltrimethoxysilane γ-methacryloxypropylmethyldimethoxysilane, (d) an alkoxysilane selected from the group consisting of vinyltrimethoxysilane, vinyltriethoxysilane, γ-mercaptopropyltrimethoxysilane, γ-chloropropyltrimethoxysilane, vinyl tris (β-methoxyethoxy) silane, dimethyl dimethoxysilane, methyltrimethoxysilane, tetramethoxysilane, dimethyldimethoxysilane, methyltriethoxysilane, tetraethoxysilane, diphenyldimethoxysilane, and phenyltrimethoxysilane; and (e) an organic titanic acid ester; or a mixture thereof, and (C) a condensation catalyst of a silanol compound.

2. The one component room temperature curable sealant composition according to claim 1, which comprises 100 parts by weight of the polyether polymer (A), from 0.5 to 10 parts by weight of the partial addition condensation product (B) and from 0.05 to 5 parts by weight of the condensation catalyst (C).

3. The one component room temperature curable sealant composition according to claim 1, wherein the partial addition condensation product is a condensation product of one equivalent of the aminoalkylalkoxysilane (a) with from 0.3 to 1.0 equivalent of the epoxy compound (b), from 0.03 to 2.6 equivalent of the compound (c), from 0.03 to 2.6 equivalent of the alkoxysilane (d), and from 0.1 to 1.2 equivalent of the organic titanic ester (e) or a mixture thereof.

4. The one component room temperature curable sealant composition according to claim 1, wherein the polyether polymer (A) has a principal chain comprising repeating units represented by the general formula —R—O— where R is a divalent alkylene group having from 2 to 4 carbon atoms.

5. The one component room temperature curable sealant composition according to claim 1, wherein the polyether polymer (A) is a reaction product of a polyether urethane prepolymer having a terminal isocyanate group and γ-aminopropyltrimethoxysilane, γ-aminopropyltriethoxysilane or γ-mercaptopropyltrimethoxysilane, or an oxypropylene polymer having a terminal silylether group represented by the formula:

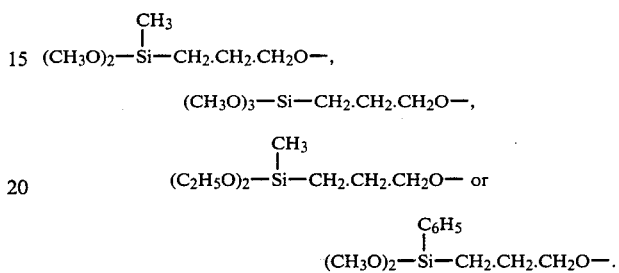

6. The one component room temperature curable sealant composition according to claim 1, wherein the aminoalkylalkoxysilane (a) is selected from the group consisting of aminomethyltriethoxysilane, N-β-(aminoethyl) aminomethyltrimethoxysilane, aminomethyldiethoxysilane, N-β(aminoethyl) methyltributoxysilane, γ-aminopropyltrimethoxysilane, γ-aminopropyltriethoxysilane, γ-aminopropylmethyldiethoxysilane, γ-aminoisobutyltrimethoxysilane, N-β(aminoethyl)γ-aminopropyltrimethoxysilane, N-β(aminoethyl) γ-aminopropylmethyldimethoxysilane, and [{N-β(aminoethyl)} N-β(amonoethyl)] γ-aminopropyltrimethoxysilane.

7. The one component room temperature curable sealant composition according to claim 1, wherein the epoxy compound (b) is a bisphenol A type epoxy compound.

8. The one component room temperature curable sealant composition according to claim 1, wherein the organic titanic acid ester is selected from the group consisting of tetraisopropyl titanate tetra-n-butyl titanate, butyl titanate dimer and tetra (2-ethylhexyl) titanate.

9. The one component room temperature curable sealant composition according to claim 1, wherein the condensation catalyst (C) of a silanol cmpound is selected from the group consisting of an organic silicone titanate, stannous octoate dibutyl tin diacetate, dibutyl tin dilaurate and dibutylamine-2-ethylhexoate.

* * * * *